(12) United States Patent
Lee

(10) Patent No.: US 11,490,108 B2
(45) Date of Patent: Nov. 1, 2022

(54) METHOD OF DECODING/ENCODING A VIDEO SIGNAL WITH SUB-BLOCK BASED MOTION VECTOR DERIVATION

(71) Applicant: KT CORPORATION, Gyeonggi-do (KR)

(72) Inventor: Bae Keun Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/619,200

(22) PCT Filed: Aug. 27, 2018

(86) PCT No.: PCT/KR2018/009867
§ 371 (c)(1),
(2) Date: Dec. 4, 2019

(87) PCT Pub. No.: WO2019/045391
PCT Pub. Date: Mar. 7, 2019

(65) Prior Publication Data
US 2020/0154128 A1 May 14, 2020

(30) Foreign Application Priority Data
Aug. 29, 2017 (KR) .......................... 10-2017-0109638

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/132* (2014.11);
(Continued)

(58) Field of Classification Search
CPC .. H04N 19/176; H04N 19/583; H04N 19/124; H04N 19/513; H04N 19/61; H04N 19/132; H04N 19/159
See application file for complete search history.

(56) References Cited

U.S. PATENT DOCUMENTS

2004/0264576 A1  12/2004 Woods et al.
2005/0078755 A1   4/2005 Woods et al.
(Continued)

FOREIGN PATENT DOCUMENTS

KR          10-0788707 B1   12/2007
KR     10-2014-0096130 A     8/2014
(Continued)

OTHER PUBLICATIONS

Chen, Algorithm Description of Joint Exploration Test Model 7 (JEM 7), Joint Video Exploration Team (JVET) of ITU-T SG 16 WP 3 and ISO/IEC JTC 1/SC 29/WG 11 7th Meeting: Torino, IT, Jul. 13-21, 2017; Document: JVET-G1001-v1, 13-17. (Year: 2017).*
(Continued)

*Primary Examiner* — Alison Slater
(74) *Attorney, Agent, or Firm* — IP Legal Services, LLC

(57) ABSTRACT

A method of video decoding according to the present invention comprises obtaining motion information for a current block, obtaining a first prediction block for a first sub-block in the current block by performing motion compensation based on the motion information, and obtaining a second prediction block by performing overlapped block motion compensation on the first sub-block.

5 Claims, 8 Drawing Sheets

(51) Int. Cl.
*H04N 19/132* (2014.01)
*H04N 19/159* (2014.01)
*H04N 19/176* (2014.01)
*H04N 19/583* (2014.01)

(52) U.S. Cl.
CPC ......... *H04N 19/159* (2014.11); *H04N 19/176* (2014.11); *H04N 19/583* (2014.11)

(56) References Cited

U.S. PATENT DOCUMENTS

| | | |
|---|---|---|
| 2006/0193388 A1 | 8/2006 | Woods et al. |
| 2012/0099652 A1 | 4/2012 | Woods et al. |
| 2013/0128974 A1 | 5/2013 | Chien et al. |
| 2013/0259130 A1 | 10/2013 | Coban et al. |
| 2016/0330475 A1* | 11/2016 | Zhou .................... H04N 19/583 |
| 2017/0230666 A1* | 8/2017 | Tourapis .............. H04N 19/103 |
| 2017/0238005 A1* | 8/2017 | Chien ................... H04N 19/176 375/240.16 |
| 2017/0272782 A1* | 9/2017 | Li .......................... H04N 19/96 |
| 2017/0332095 A1* | 11/2017 | Zou ....................... H04N 19/567 |
| 2018/0063531 A1* | 3/2018 | Hu ......................... H04N 19/48 |
| 2020/0177911 A1* | 6/2020 | Aono .................... H04N 19/563 |

FOREIGN PATENT DOCUMENTS

| | | |
|---|---|---|
| KR | 10-1663397 B1 | 10/2016 |
| WO | 2017/003063 A1 | 1/2017 |

OTHER PUBLICATIONS

Jianle Chen et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016.

* cited by examiner

-Prior Art-

Current picture    Motion source picture

METHOD OF DECODING/ENCODING A VIDEO SIGNAL WITH SUB-BLOCK BASED MOTION VECTOR DERIVATION

CROSS REFERENCE TO RELATED APPLICATIONS

This application is a National Stage Patent Application of PCT International Patent Application No. PCT/KR2018/009867 (filed on Aug. 27, 2018) under 35 U.S.C. § 371, which claims priority to Korean Patent Application No. 10-2017-0109638 (filed on Aug. 29, 2017), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter prediction technique of predicting a pixel value included in a current picture from a previous or subsequent picture of the current picture; an intra prediction technique of predicting a pixel value included in a current picture by using pixel information in the current picture; an entropy encoding technique of assigning a short code to a value with a high appearance frequency and assigning a long code to a value with a low appearance frequency; and the like. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is intended to provide a method and an apparatus for efficiently performing inter prediction for an encoding/decoding target block in encoding/decoding a video signal.

An object of the present invention is intended to provide a method and an apparatus for applying overlapped block motion compensation on a block on which motion compensation is performed.

An object of the present invention is intended to provide a method and an apparatus for applying optical flow on the basis of a sub-block in encoding/decoding a video signal.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may obtain a motion vector of a current block, and update the motion vector when bi-directional optical flow is applied to the current block, and perform motion compensation on the current block by using the updated motion vector. In this case, the bi-directional optical flow may be applied on the basis of a sub-block having a predetermined size in the current block.

A method and an apparatus for encoding a video signal according to the present invention may obtain a motion vector of a current block, and update the motion vector when bi-directional optical flow is applied to the current block, and perform motion compensation on the current block by using the updated motion vector. In this case, the bi-directional optical flow may be applied in units of sub-blocks having a predetermined size in the current block.

In a method and an apparatus for encoding/decoding a video signal according to the present invention, updating the motion vector comprises obtaining a motion refinement vector for a sub-block in the current block and updating the motion vector by using the motion refinement vector.

In a method and an apparatus for encoding/decoding a video signal according to the present invention, the motion refinement vector may be obtained based on an average value of motion refinement vectors of the samples included in the sub-block.

In a method and an apparatus for encoding/decoding a video signal according to the present invention, the motion refinement vector may be obtained based on a sample of a specific position in the sub-block.

In a method and an apparatus for encoding/decoding a video signal according to the present invention, the sample of the specific location may include at least one of a sample located at a corner of the sub-block or a sample located at the center of the sub-block.

In a method and an apparatus for encoding/decoding a video signal according to the present invention, the size or shape of the sub-block may be determined based on at least one of the size or shape of the current block.

In a method and an apparatus for encoding/decoding a video signal according to the present invention, the size or shape of the sub-block may be determined based on a resolution of an image or whether overlapped block motion compensation on the current block on which the motion compensation is performed.

In a method and an apparatus for encoding/decoding a video signal according to the present invention, applying overlapped block motion compensation on the current block on which the motion compensation is performed may be included. In this case, the overlapped block motion compensation may be applied on the basis of a sub-block of a predetermined size in the current block.

The features briefly summarized above for the present invention are only illustrative aspects of the detailed description of the invention that follows, but do not limit the scope of the invention.

Advantageous Effects

According to the present invention, an efficient inter prediction may be performed for an encoding/decoding target block.

According to the present invention, there is an advantage of increasing an efficiency of inter prediction by applying overlapped block motion compensation on a block on which a motion compensation is performed, According to the present invention, there is an advantage of reducing memory usage by applying optical flow on the basis of a block rather than a sample.

The effects obtainable by the present invention are not limited to the above-mentioned effects, and other effects not mentioned can be clearly understood by those skilled in the art from the description below

MODE FOR INVENTION

Figure 1:
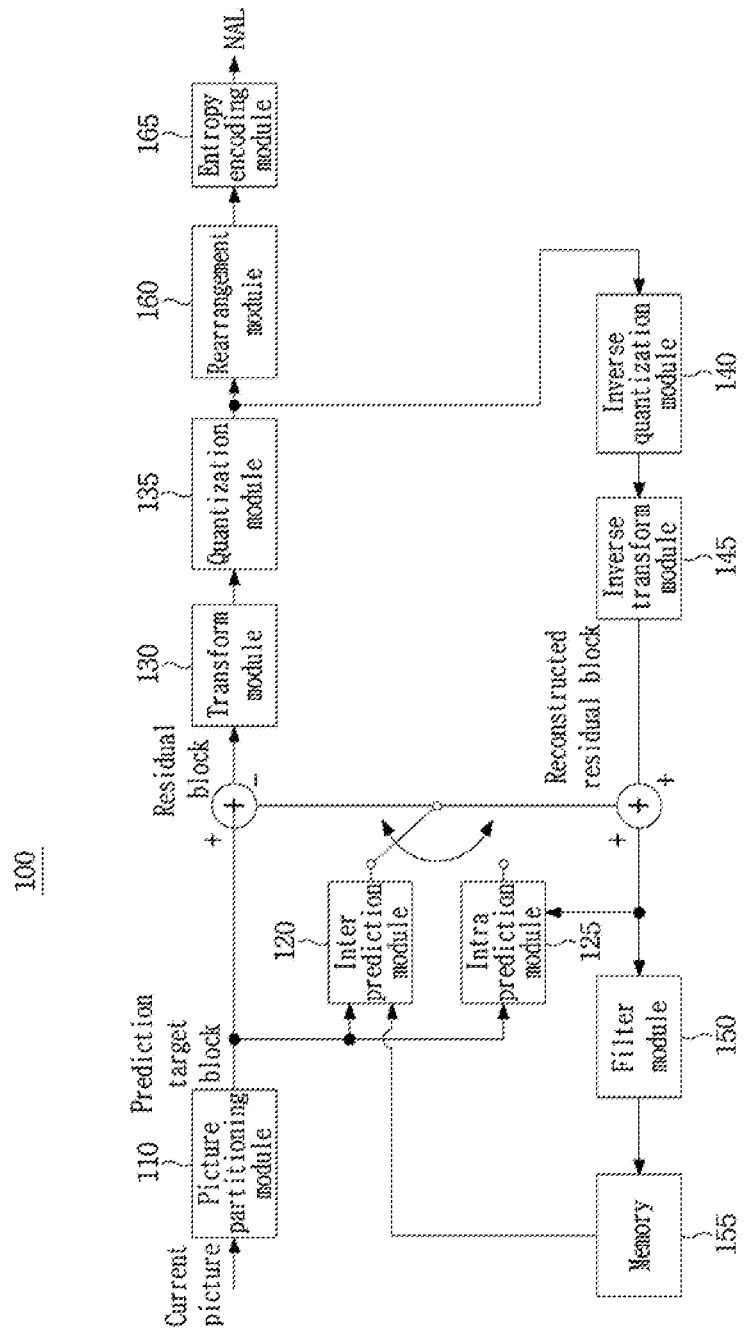
FIG. 1 is a block diagram illustrating a device for encoding a video as an embodiment to which the present invention is applied.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of multiple items or any one of multiple terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video as an embodiment to which the present invention is applied.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video, and does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be partitioned into multiple constitutional parts to perform each function. The embodiment where each constitutional part is combined and the embodiment where one constitutional part is partitioned are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so that one prediction unit of prediction units partitioned in a single coding unit have a different shape and/or size from other prediction unit.

When a prediction unit performing intra prediction based on a coding unit is generated and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit performing prediction may be different from the processing unit for which the prediction method and detailed content is determined. For example, the prediction method, the prediction mode, etc. may be determined on the basis of the prediction unit, and prediction may be performed on the basis of the transform unit. A residual value (residual block) between the generated prediction block and an original block may be input to the transform module 130. Also, prediction mode information, motion vector information, etc. used for prediction may be encoded with the residual value in the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel on the basis of a ¼ pixel. In the case of chroma signals, a 4-tap DCT-based interpolation filter having different filter coefficient may be used to generate pixel information of an integer pixel or less than an integer pixel on the basis of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value on the basis of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when a size of the prediction unit is the same as a size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. A type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on a size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, or an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture on the basis of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be partitioned into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
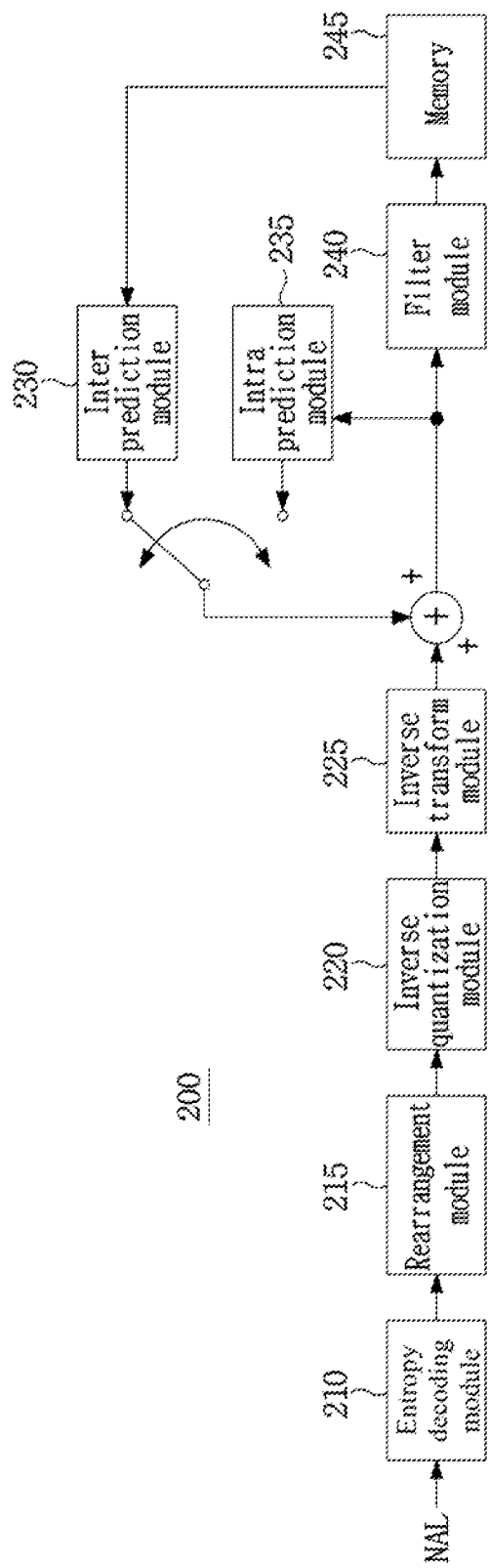
FIG. 2 is a block diagram illustrating a device for decoding a video as an embodiment to which the present invention is applied.

FIG. 2 is a block diagram illustrating a device for decoding a video as an embodiment to which the present invention is applied.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, a size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when a size of the prediction unit is the same as a size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may partition a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on a type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by partitioned into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be partitioned into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively partitioned or partitioned into base units for performing prediction, quantization, transform, or in-loop filtering, or the like. For example, a partition of arbitrary size generated by dividing the coding unit may be defined as a coding unit, or may be defined as a transform unit or a prediction unit, which is a base unit for performing prediction, quantization, transform, in-loop filtering, or the like.

Partitioning of a coding tree unit or a coding unit may be performed based on at least one of the vertical line or the horizontal line. In addition, the number of vertical lines or horizontal lines partitioning the coding tree unit or the coding unit may be at least one or more. For example, the coding tree unit or the coding unit may be partitioned into two partitions using one vertical line or one horizontal line, or the coding tree unit or the coding unit may be partitioned into three partitions using two vertical lines or two horizontal lines. Alternatively, the coding tree unit or the coding unit may be partitioned into four partitions having a length and the width of by using one vertical line and one horizontal line.

When a coding tree unit or a coding unit is partitioned into multiple partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is partitioned into a quad tree structure, a triple tree structure, or a binary tree structure. However, it is also possible to partition a coding tree unit or a coding unit using a larger number of vertical lines or a larger number of horizontal lines.

Figure 3:
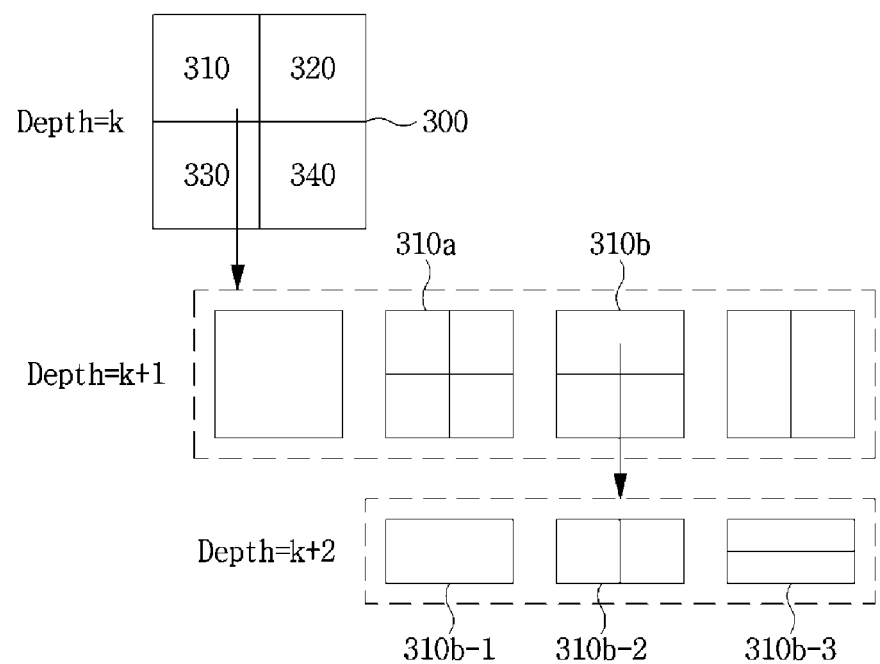
FIG. 3 is a diagram illustrating an example of hierarchically partitioning a coding block based on a tree structure as an embodiment to which the present invention is applied.

FIG. 3 is a diagram illustrating an example of hierarchically partitioning a coding block based on a tree structure as an embodiment to which the present invention is applied.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined on the basis of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree, a triple tree, or a binary tree. Here, quad tree-based partitioning may mean that a 2N×2N coding block is partitioned into four N×N coding blocks, triple tree-based partitioning may mean that one coding block is partitioned into three coding blocks, and binary-based partitioning may mean that one coding block is partitioned into two coding blocks. Even if the triple-based partitioning or the binary tree-based partitioning is performed, a square-shaped coding block may exist in the lower depth. Also, after the triple-based partitioning or the binary-based partitioning is performed, generating a square-shaped coding block may be limited in a lower depth.

Binary tree-based partitioning may be symmetrically or asymmetrically performed. The coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. At least one of quad tree-based partitioning, triple tree-based partitioning, or binary tree-based partitioning may no longer be performed on the coding block partitioned based on the binary tree.

Alternatively, the triple tree-based partitioning or the binary tree-based partitioning may be allowed for the coding block partitioned based on the binary tree, but only one of the horizontal or vertical partitioning may be limitedly allowed.

For example, an additional partition or an additional partition direction may be limited for a coding block partitioned based on the binary tree according to a location, an index, a shape, or an additional partition type of a neighboring partition of the coding block partitioned based on the binary tree, or the like. For example, when an index of the coding block that precedes the coding order among the two coding blocks generated by the binary tree based-partitioning is 0 (hereinafter referred to as coding block index 0) and an index of the coding block that follows the coding order among the two coding blocks generated by the binary tree-based partitioning is 1 (hereinafter referred to as coding block index 1), in the case where the binary tree-based partitioning is applied to all coding blocks having a coding block index of or a coding block index of 1, the binary tree-based partitioning direction of the coding block having the coding block index of 1 may be determined according to a binary tree-based partitioning direction of the coding block having the coding block index of 0. Specifically, when the binary tree-based partitioning direction of the coding block having the coding block index of 0 is to partition the coding block having the coding block index of 0 into square partitions, binary tree-based partitioning of the coding block having the coding block index of 1 may be limited to have a different direction from binary tree-based partitioning of the coding block having a coding block index of 1. Thus, the coding blocks having the coding block index of 0 and the coding block index of 1 may be restricted from being partitioned into square partitions. In this case, encoding/decoding of information indicating the binary tree partitioning direction of the coding block having the coding block index of 1 may be omitted. This is because partitioning all of the coding blocks having the coding block index of 0 and the coding block index of 1 into square partitions has the same effect as partitioning the upper depth block on the basis of a quad tree, so that allowing partitioning of all into square partitions is undesirable in terms of coding efficiency.

Triple tree-based partitioning means partitioning a coding block into three partitions in the horizontal or vertical direction. All three partitions generated due to triple tree-based partitioning may have different sizes. Alternatively, two of the partitions generated due to triple tree-based partitioning may have the same size, and the other one may have a different size. For example, the width ratio or height ratio of partitions generated as the coding block is partitioned may be set to 1:n:1, 1:1:n, n:1:1 or m:n:1 depending on the partitioning direction. Here, m and n may be 1 or a real number greater than 1, for example, an integer such as 2.

Triple tree-based partitioning may be performed on a coding block in which quad tree-based partitioning is no longer performed. For the coding block partitioned based on the triple tree, at least one of quad tree-based partitioning, triple tree-based partitioning, or binary tree-based partitioning may be set to no longer be performed.

Alternatively, triple tree-based partitioning or binary tree-based partitioning may be allowed for the coding block partitioned based on the triple tree, but only one of horizontal or vertical partitioning may be limitedly allowed.

For example, an additional partition or an additional partition direction may be limited for a coding block partitioned based on the triple tree according to a location, an index, a shape, or an additional partition type of a neighboring partition of the coding block partitioned based on the triple tree, or the like. For example, one of horizontal division or vertical division may be limited to a partition having the largest size among coding blocks generated due to triple tree-based partitioning. Specifically, the largest partition among coding blocks generated due to triple tree-based partitioning may not allow binary tree partitioning in the same direction or triple tree partitioning direction in the same direction as the triple tree partitioning direction of the upper depth partition. In this case, encoding/decoding of information indicating the binary tree partitioning direction or the triple tree partitioning direction may be omitted for the largest partition among the coding blocks partitioned based on the triple tree.

Partitioning based on a binary tree or triple tree may be limited according to the size or shape of a current block. Here, the size of the current block may be expressed based on at least one of the width, height of the current block, the minimum/maximum of the width/height, the sum of the width and height, the product of the width and height, or the number of samples included in the current block. For example, when at least one of the width or height of the current block is larger than a pre-defined value, partitioning based on a binary tree or triple tree may not be allowed. Herein, the pre-defined value may be an integer such as 16, 32, 64, or 128. As another example, when the width-to-height ratio of the current block is larger than a pre-defined value or smaller than the pre-defined value, partitioning based on a binary tree or triple tree may not be allowed. When the predefined value is 1, partitioning based on a binary tree or triple tree may be allowed only when the current block is a square block having the same width and height.

The partitioning in the lower depth may be determined depending on the partitioning type of the upper depth. For example, when binary tree-based partitioning is allowed in two or more depths, only a binary tree-based partitioning of the same type as a binary tree partitioning of an upper depth may be allowed in a lower depth. For example, when the binary tree-based partitioning is performed in the 2N×N type in the upper depth, the binary tree-based partitioning in the 2N×N type may be performed in the lower depth. Alternatively, when binary tree-based partitioning is performed in an N×2N type in an upper depth, N×2N-type binary tree-based partitioning may be allowed in a lower depth.

Conversely, it is also possible to allow only binary tree-based partitioning having a different type from the binary tree partitioning of the upper depth in the lower depth.

For a sequence, a slice, a coding tree unit, or a coding unit, it may be limited to use only a special type of binary tree-based partitioning or a special type of triple tree-based partitioning. For example, it may be limited to allow only 2N×N or N×2N type binary tree-based partitioning for a coding tree unit. The allowed partitioning type may be predefined in the encoder or the decoder, and information about the allowed partitioning type or the not allowed partitioning type may be encoded and signaled through a bitstream.

Figure 5A:
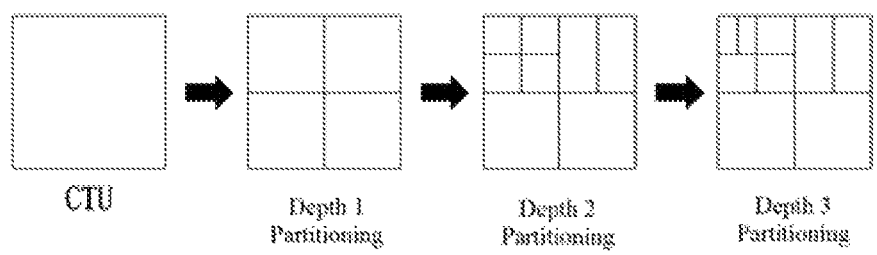
FIGS. 5A and 5B are diagrams illustrating an example in which only a binary tree-based partition of a pre-determined type is allowed as an embodiment to which the present invention is applied.
Figure 5B:
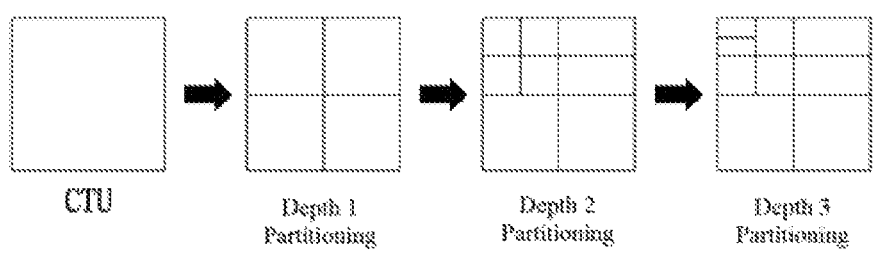

FIGS. 5A and 5B are diagrams illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on a size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in the vertical direction or the horizontal direction, etc. may be used.

In addition, information on the number of times a binary/triple tree partitioning is allowed, a depth in which the binary/triple tree partitioning is allowed, or the number of the depths in which the binary/triple tree partitioning is allowed may be obtained for a coding tree unit or a specific coding unit. The information may be encoded on the basis of a coding tree unit or a coding unit, and may be transmitted to a decoder through a bitstream.

For example, a syntax 'max_binary_depth_idx_minus1' indicating a maximum depth in which binary tree partitioning is allowed may be encoded/decoded through a bitstream. In this case, max_binary_depth_idx_minus1+1 may indicate the maximum depth in which the binary tree partitioning is allowed.

Figure 6:
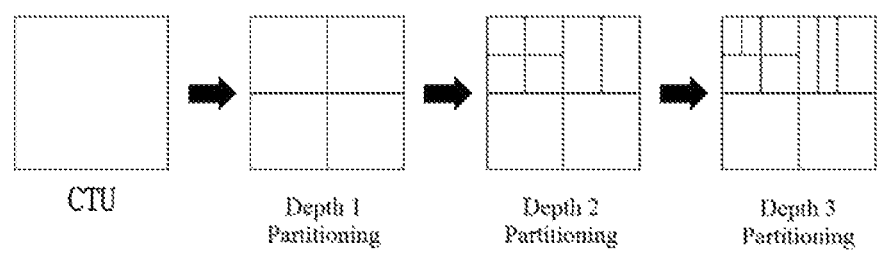
FIG. 6 is a diagram for explaining an example in which information related to the allowable number of binary tree partitioning is encoded/decoded as an embodiment to which the present invention is applied.

Referring to the example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth in which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary/triple tree partitioning is allowed, the depth in which the binary/triple tree partitioning is allowed, or the number of the depths in which the binary/triple tree partitioning is allowed may be obtained for each sequence or each slice. For example, the information may be encoded on the basis of a sequence, a picture, or a slice unit and transmitted through a bitstream. In contrast, a depth in which the binary/triple tree partitioning is allowed, or the number of the depths in which the binary/triple tree partitioning is allowed may be defined for each of a sequence, a picture, or a slice unit. Accordingly, at least one of the number of the binary/triple tree partitioning in the first slice and the second slice, the maximum depth in which the binary/triple tree partitioning is allowed in the first slice and the second slice, or the number of depths in which the binary/triple tree partitioning is performed in the first slice and the second slice may be difference from a second slice. For example, in the first slice, binary tree partitioning may be allowed for only one depth, while in the second slice, binary tree partitioning may be allowed for two depths.

As another example, the number of times the binary/triple tree partitioning is allowed, the depth in which the binary/triple tree partitioning is allowed, or the number of depths in which the binary/triple tree partitioning is allowed may be set differently according to a time level identifier (TemporalID) of a slice or a picture. Here, the temporal level identifier (TemporalID) is used to identify each of multiple layers of video having a scalability of at least one of view, spatial, temporal or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning or the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of the horizontal direction or the vertical direction depending on a partitioning direction, and the partitioning direction may be determined based on the information on whether binary tree-based partitioning is performed in the vertical direction or the horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of the vertical direction or coding blocks 310b-3 of the horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on a size/depth of the coding block that quad tree-based partitioning is allowed, the information on the size/depth of the coding block that binary tree-based partitioning is allowed, or the information on the size/depth of the coding block that binary tree-based partitioning is not allowed.

A number of a candidate that represents a size of a coding block may be limited to a predetermined number, or the size of the coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree, a binary tree, and a triple tree, a coding unit may be represented as a square or rectangular shape of an arbitrary size.

A coding block may be encoded/decoded using at least one of a skip mode, intra prediction, inter prediction, or a skip method.

As another example, intra prediction or inter prediction may be performed in the same size as a coding block or a unit smaller than the coding block through partitioning of the coding block. For this purpose, once a coding block is determined, a prediction block may be determined through prediction partitioning of the coding block. The prediction partitioning of the coding block may be performed by a partition mode (Part mode) indicating a partition type of the coding block. A size or a shape of the prediction block may be determined according to the partition mode of the coding block. For example, a size of a prediction block determined according to the partition mode may be equal to or smaller than a size of a coding block.

Figure 7:
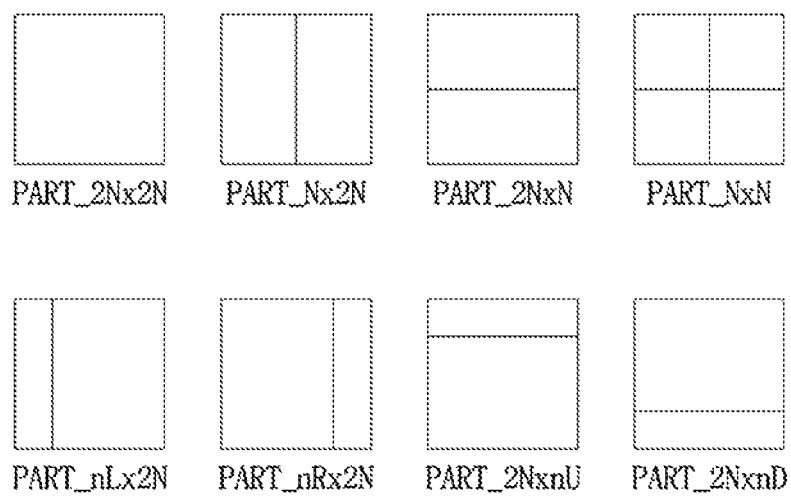
FIG. 7 is a diagram illustrating a partition mode applicable to a coding block as an embodiment to which the present invention is applied.

FIG. 7 is a diagram illustrating a partition mode that may be applied to a coding block when the coding block is encoded by inter prediction.

Figure 4:
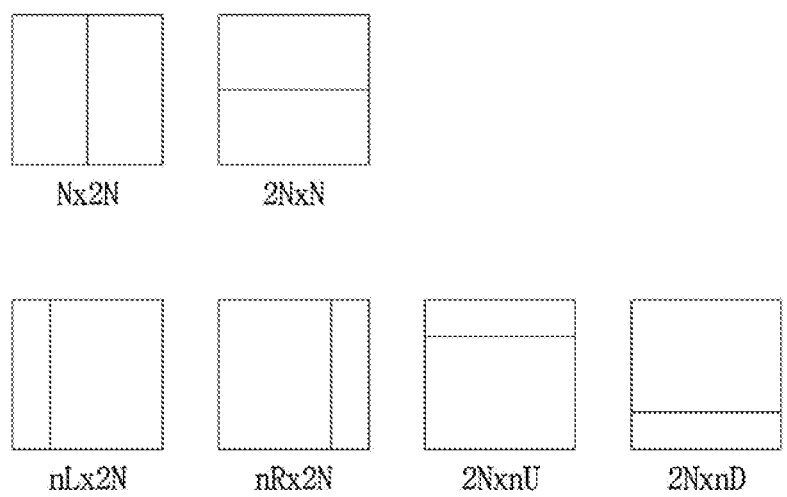
FIG. 4 is a diagram illustrating a partition type in which binary tree-based partitioning is allowed as an embodiment to which the present invention is applied.

When a coding block is encoded by inter prediction, one of 8 partitioning modes may be applied to the coding block, as in the example shown in FIG. 4.

When a coding block is encoded by intra prediction, a partition mode PART_2N×2N or a partition mode PART_N×N may be applied to the coding block.

PART_N×N may be applied when a coding block has a minimum size. Here, the minimum size of the coding block may be pre-defined in an encoder and a decoder. Or, information regarding the minimum size of the coding block may be signaled via a bitstream. For example, the minimum size of the coding block may be signaled through a slice header, so that the minimum size of the coding block may be defined per slice.

In general, a prediction block may have a size from 64×64 to 4×4. However, when a coding block is encoded by inter prediction, it may be restricted that the prediction block does not have a 4×4 size in order to reduce memory bandwidth when performing motion compensation.

Figure 8:
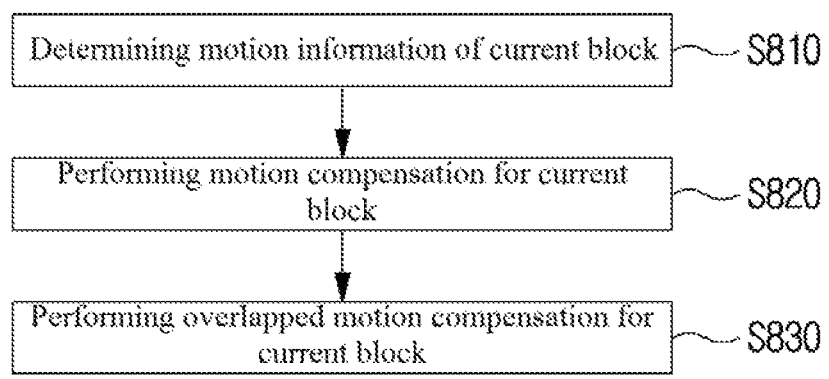
FIG. 8 is a flowchart illustrating an inter prediction method as an embodiment to which the present invention is applied.

FIG. 8 is a flowchart illustrating an inter prediction method as an embodiment to which the present invention is applied.

Referring to FIG. 8, motion information of a current block is determined S810. The motion information of the current block may include at least one of a motion vector relating to the current block, a reference picture index of the current block, or an inter prediction direction of the current block.

The motion information of the current block may be obtained based on at least one of information signaled through a bitstream or motion information of a neighboring block adjacent to the current block.

Figure 9:
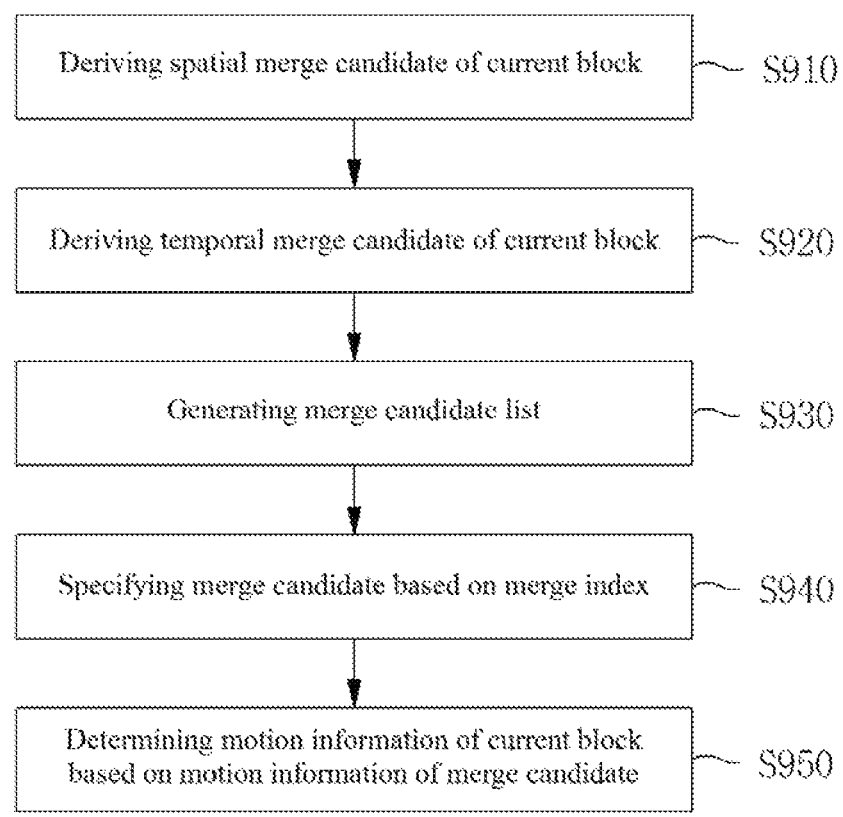
FIG. 9 is a diagram illustrating a process of deriving motion information of a current block when a merge mode is applied to the current block.

FIG. 9 is a diagram illustrating a process of deriving motion information of a current block when a merge mode is applied to a current block.

If the merge mode is applied to the current block, a spatial merge candidate may be derived from a spatial neighboring block of the current block S910. The spatial neighboring block may include at least one of blocks adjacent to a top, a left, or a corner (e.g., at least one of a top left corner, a top right corner, or a bottom left corner) of the current block. Herein, a block adjacent to the top of the current block may include at least one of a block neighboring the top left sample of the current block, a block neighboring the top center sample of the current block or a block neighboring the top right sample of the current block, and a block adjacent to the left side of the current block may include at least one of a block neighboring the top left sample of the current block, a block neighboring the left center sample of the current block or a block neighboring the bottom left sample of the current block.

A spatial merge candidate of a current block may be derived from a spatial non-neighboring block. For example, the spatial merge candidate of the current block may be derived based on at least one of a block located on the same vertical line as a block adjacent to the top, top right corner, or top left corner of the current block, a block located on the same horizontal line as a block adjacent to the left, bottom left corner, or top left corner of the current block, or a block located on the same diagonal line as a block adjacent to the corner of the current block. As a specific example, when a neighboring block adjacent to the current block cannot be used as a merge candidate, a block not adjacent to the current block may be used as the merge candidate of the current block.

Motion information of a spatial merge candidate may be set to be the same as the motion information of the spatial neighboring block.

A temporal merge candidate may be derived from a temporal neighboring block of the current block S920. The temporal neighboring block may mean a co-located block included in a collocated picture. The collocated picture has a picture order count (POC) different from a current picture including the current block. The collocated picture may be determined to a picture having a predefined index in a reference picture list or may be determined by an index signaled from a bitstream. The temporal neighboring block may be determined to a block having the same position and size as the current block in the collocated picture or a block adjacent to the block having the same position and size as the current block. For example, at least one of a block including center coordinates of the block having the same position and size as the current block in the collocated picture or a block adjacent to a bottom right boundary of the block may be determined as the temporal neighboring block.

Motion information of the temporal merge candidate may be determined based on motion information of the temporal neighboring block. For example, a motion vector of the temporal merge candidate may be determined based on a motion vector of the temporal neighboring block. In addition, an inter prediction direction of the temporal merge candidate may be set to be the same as an inter prediction direction of the temporal neighboring block. However, a reference picture index of the temporal merge candidate may have a fixed value. For example, the reference picture index of the temporal merge candidate may be set to '0'.

Thereafter, the merge candidate list including the spatial merge candidate and the temporal merge candidate may be generated S930. If the number of merge candidates included in the merge candidate list is smaller than the maximum number of merge candidates, a combined merge candidate combining two or more merge candidates or a merge candidate have zero motion vector (0, 0) may be included in the merge candidate list.

Merge candidates may be added to a merge candidate list in a pre-defined priority. The higher the priority, the smaller the index assigned to the merge candidate. For example, a spatial merge candidate may be added to the merge candidate list before a temporal merge candidate. In addition, the spatial merge candidates may be added to the merge candidate list in the order of the spatial merge candidate derived from the left neighboring block, the spatial merge candidate derived from the top neighboring block, the spatial merge candidate derived from the block adjacent to the top right corner, the spatial merge candidate derived from the block adjacent to the bottom left corner, and the spatial merge candidate derived from the block adjacent to the top left corner.

As another example, a priority between merge candidates may be determined according to the size or shape of the current block. For example, when the current block has a rectangular shape having the width greater than the height, the spatial merge candidate derived from the left neighboring block may be added to the merge candidate list before the spatial merge candidate derived from the top neighboring block. On the other hand, if the current block has a rectangular shape having the height is greater than the width, the spatial merge candidate derived from the top neighboring block may be added to the merge candidate list before the spatial merge candidate derived from the left neighboring block.

As another example, a priority among merge candidates may be determined according to motion information of each of the merge candidates. For example, the merge candidate having bi-directional motion information may have a higher priority than a merge candidate having uni-directional motion information. Accordingly, a merge candidate having bi-directional motion information may be added to the merge candidate list before the merge candidate having uni-directional motion information.

As another example, after generating a merge candidate list according to a pre-defined priority, merge candidates may be rearranged. Rearrangement may be performed based on motion information of the merge candidates. As an example, the rearrangement may be performed based on at least one of whether the merge candidate has bi-directional motion information, the magnitude of a motion vector, or a picture order count (POC) between a current picture and a reference picture of the merge candidate. Specifically, the rearrangement may be performed for the merge candidate having the bi-directional motion information to have a higher priority than the merge candidate having the uni-directional motion information.

When the merge candidate list is generated, at least one of merge candidates included in the merge candidate list may be specified based on a merge candidate index S940.

Motion information of the current block may be set to be the same as motion information of the merge candidate specified by the merge candidate index S950. For example, when the spatial merge candidate is selected by the merge candidate index, the motion information of the current block may be set to be the same as the motion information of the spatial neighboring block. Alternatively, when the temporal merge candidate is selected by the merge candidate index, the motion information of the current block may be set to be the same as the motion information of the temporal neighboring block.

Figure 10:
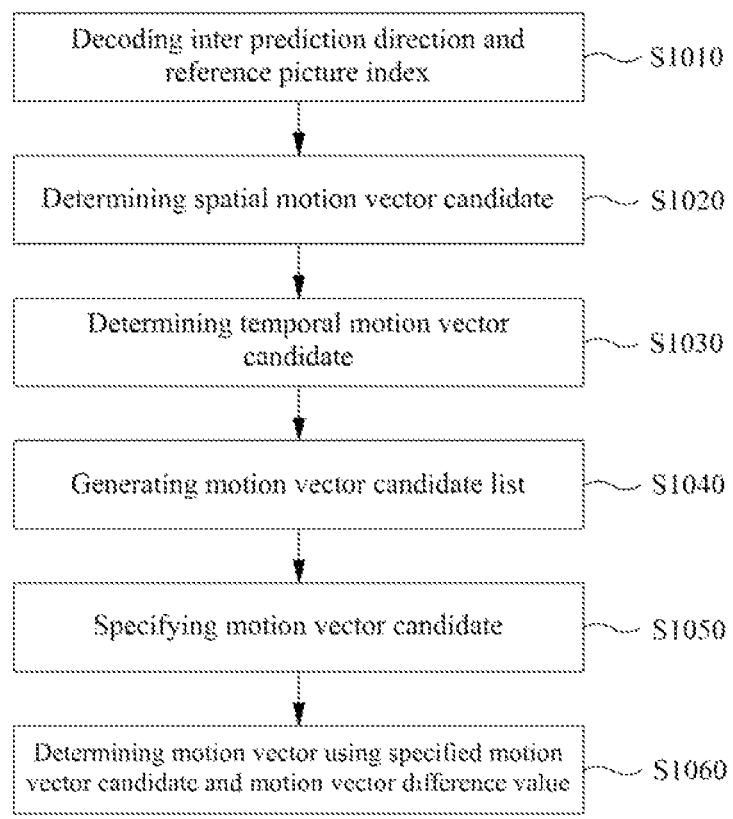
FIG. 10 is a diagram illustrating a process of deriving motion information of a current block when an AMVP mode is applied to the current block.

FIG. 10 illustrates a process of deriving motion information of a current block when an AMVP mode is applied to the current block.

When the AMVP mode is applied to the current block, at least one of an inter prediction direction or a reference picture index of the current block may be decoded from a bitstream S1010. That is, when the AMVP mode is applied, at least one of the inter prediction direction or the reference picture index of the current block may be determined based on the encoded information through the bitstream.

A spatial motion vector candidate may be determined based on a motion vector of a spatial neighboring block of the current block S1020. The spatial motion vector candidate may include at least one of a first spatial motion vector candidate derived from a top neighboring block of the current block and a second spatial motion vector candidate derived from a left neighboring block of the current block. Here, the top neighboring block may include at least one of blocks adjacent to a top or a top right corner of the current block, and the left neighboring block of the current block may include at least one of blocks adjacent to a left or a bottom left corner of the current block. A block adjacent to a top left corner of the current block may be treated as the top neighboring block, or the left neighboring block.

When reference pictures between the current block and the spatial neighboring block are different, a spatial motion vector may be obtained by scaling the motion vector of the spatial neighboring block.

A temporal motion vector candidate may be determined based on a motion vector of a temporal neighboring block of the current block S1030. If reference pictures between the current block and the temporal neighboring block are different, a temporal motion vector may be obtained by scaling the motion vector of the temporal neighboring block.

A motion vector candidate list including the spatial motion vector candidate and the temporal motion vector candidate may be generated S1040.

When the motion vector candidate list is generated, at least one of the motion vector candidates included in the motion vector candidate list may be specified based on information specifying at least one of the motion vector candidate list S1050.

The motion vector candidate specified by the information is set as a motion vector prediction value of the current block. And, a motion vector of the current block is obtained by adding a motion vector difference value to the motion vector prediction value 1060. At this time, the motion vector difference value may be parsed from the bitstream.

When the motion information of the current block is obtained, motion compensation for the current block may be performed based on the obtained motion information S820. More specifically, the motion compensation for the current block may be performed based on the inter prediction direction, the reference picture index, and the motion vector of the current block.

Inter prediction may be performed in a unit of a sub-block. In detail, the current block may be partitioned into a plurality of sub blocks, and motion information may be determined on the basis of a sub block. Then, motion compensation may be performed on the basis of a sub-block based on the determined motion information.

Whether to perform inter prediction in a unit of a sub-block may be determined based on at least one of the size, shape, or resolution of a current block. For example, when the size of the coding block is larger than a predefined size, the coding block may be divided into sub-blocks having a predetermined size, and motion compensation may be performed on the basis of a sub-block. Alternatively, information indicating whether motion compensation is performed on the basis of a sub-block may be encoded and transmitted to a decoder. The information may be transmitted on the basis of a block (e.g., a coding unit or a coding tree unit) or a slice.

When motion compensation is set to be performed on the basis of a sub-block, the current block may be divided into sub-blocks having a predetermined size/shape. Herein, the size and shape of a sub-block may be predefined in a encoder and the decoder. As an example, motion compensation may be performed on the basis of a 4×4 sized sub-block.

Alternatively, the size or shape of a sub-block may be adaptively determined according to the size or shape of a current block. For example, motion compensation may be performed in a unit of a 8×8 sub-block when a coding block is equal to or greater than 64×64, and motion compensation may be performed in a unit of a 4×4 sub-block when a coding block is smaller than 64×64. Alternatively, information indicating the size or shape of the sub-block may be encoded and transmitted to a decoder.

A mode of ATMVP (Alternative Temporal Motion Vector Prediction) or STMVP (Spatial Temporal Motion Vector Prediction) may be used to derive motion information on the basis of a sub-block.

Figure 11:
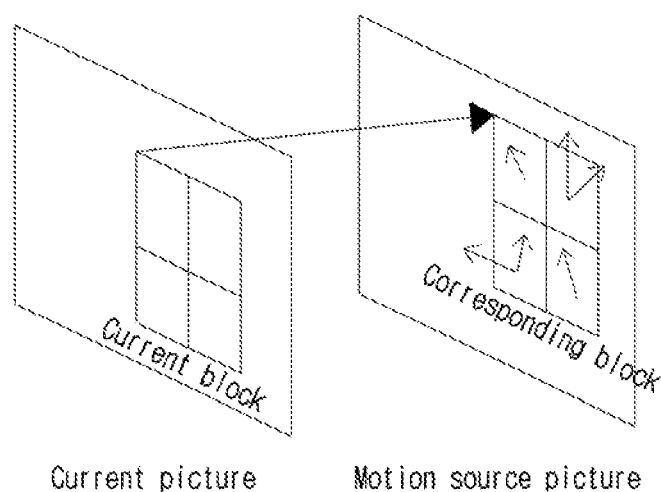
FIG. 11 is a diagram illustrating a method of deriving a motion vector on the basis of a sub-block based on ATMVP.

FIG. 11 is a diagram illustrating a method of deriving a motion vector on the basis of a sub-block based on ATMVP.

ATMVP is a method of determining a corresponding block in a reference picture corresponding to a current block and obtaining motion information for each sub-block using the determined corresponding block. The reference picture and the corresponding block may be derived based on motion information of a neighboring block. For example, the reference picture and the corresponding block may be determined using motion information of a spatial neighboring block at a pre-determine position or motion information of the first merge candidate included in the merge candidate list of the current block. The motion vector and the reference picture index of the neighboring block used to determine the reference picture and the corresponding block may be defined as a temporal vector and a motion source picture index, respectively. Based on the temporal vector and the source picture index, the corresponding block of the current block may be determined, and the determined corresponding block may be divided into sub-blocks in the same manner as the current block. The motion information of a sub-block in a corresponding block corresponding to a sub-block in the current block may be derived as the motion information of the corresponding sub-block.

Figure 12:
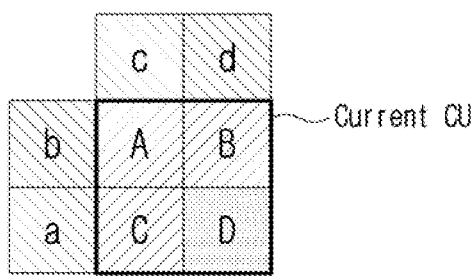
FIG. 12 is a diagram illustrating a method of deriving a motion vector on the basis of a sub-block based on STMVP.

FIG. 12 is a diagram illustrating a method of deriving a motion vector on the basis of a sub-block based on STMVP.

STMVP is a method of obtaining motion information using a spatial neighboring block and a temporal neighboring block of each sub-block. Specifically, a motion vector is derived from at least one of a spatial neighboring block adjacent to the top of a sub-block, a spatial neighboring block adjacent to the left of the sub-block, or a temporal neighboring block of the sub-block, and the motion compensation of the sub-block may be performed using derived at least one piece of motion information.

For example, in the example shown in FIG. 12, the motion vector of the sub-block A may be derived based on at least one available motion vector of the block c neighboring the top of the sub-block A, the block b neighboring the left of the sub-block A, or the temporal neighboring block of the sub-block A. Specifically, the motion vector of a sub-block A may be derived based on an average value of the motion vectors available among the block c, the block b, and the temporal neighboring block, or any one available among the block c, the block b, and the temporal neighboring block may be derived to a motion vector of the sub-block A.

When STMVP is used, motion compensation for each sub-block may be performed in a predetermined order. For example, in the example illustrated in FIG. 12, motion compensation may be performed in the order of sub-blocks A, B, C, and D in the raster scan order. Or, motion compensation of the sub-blocks may follow a vertical scan, horizontal scan, or diagonal scan order.

As motion compensation is performed in a unit of a block, image quality deterioration may occur at a block boundary due to a blocking artifact. In order to reduce image quality deterioration due to a blocking artifact, an overlapped block motion compensation (OBMC) may be performed on a block on which motion compensation is performed (S830).

Whether to perform overlapped block motion compensation may be determined based on at least one of the size, shape, inter prediction mode, motion information (e.g., the magnitude of a motion vector of the current block, or the picture order count (POC) between a current picture and a reference picture), or image resolution (the first embodiment). For example, overlapped block motion compensation may be performed when the number of samples included in the current block is larger than a pre-defined value.

Alternatively, information indicating whether to perform overlapped block motion compensation may be signaled through a bitstream (the second embodiment). The information may be signaled at the picture, slice, or block (e.g., coding block or prediction block) level.

Alternatively, the first embodiment and the second embodiment may be combined to determine whether to perform overlapped block motion compensation. For example, a flag indicating whether to perform overlapped block motion compensation may be signaled only when the size of a current block is greater than or equal to a pre-defined size or only when the inter prediction mode of the current block is a pre-defined mode (e.g., merge mode or AMVP mode).

Overlapped block motion compensation may be performed in a unit of a coding block, a prediction block generated by performing motion compensation on the coding block, or a sub-block of a pre-determined size. When motion compensation is performed in a unit of a coding block and overlapped block motion compensation is performed in a unit of a sub-block, motion information of a sub-block in a coding block may be set to be the same as a motion block of a coding block.

In order to perform overlapped block motion compensation in a unit of a sub-block, a current block may be partitioned into a plurality of sub-blocks. In this case, the size and shape of the sub-block may be pre-defined in an encoder and a decoder. For example, a 4×4 square block may be defined as a sub-block. Alternatively, the sub-block may be defined in a unit of a line (e.g., at least one column and/or at least one row).

Alternatively, when motion compensation is performed in a unit of a sub-block, a sub-block in which overlapped block motion compensation is performed may be set in the same manner as a sub-block in which motion compensation is performed.

Alternatively, the size or shape of a sub-block may be adaptively determined according to the size, shape, or number of samples of a current block. For example, overlapped block motion compensation may be performed in a unit of an 8×8 sub-block when a prediction block is equal to or greater than 64×64, and overlapped block motion compensation may be performed in a unit of a 4×4 sub-block when a prediction block is smaller than 64×64.

Alternatively, information indicating the size or shape of a sub-block may be encoded and transmitted to a decoder.

For convenience of description, it is assumed in the embodiment described below that overlapped block motion compensation is performed in a unit of a sub-block. In addition, a prediction block generated as a result of performing motion compensation (that is, as a result of performing step S820) will be referred to as 'first prediction block', and a prediction block generated as a result of applying overlapped block motion compensation to the first prediction block (that is, as a result of performing step S830) will be referred to as 'second prediction block'. In addition, a prediction sample included in the first prediction block will be referred to as 'first prediction sample', and a prediction sample included in the second prediction block will be referred to as 'second prediction sample'. In addition, a sub-block that is a target of overlapped block motion compensation will be referred to as a 'current sub-block'.

Overlapped block motion compensation may be performed based on weighted prediction between prediction blocks or weighted prediction between prediction samples. In this case, at least one of a plurality of prediction blocks or a plurality of samples used to perform overlapped block motion compensation is a sample included in the neighboring block or the neighboring block of the current sub-block or is generated based on motion information of the neighboring block. Alternatively, the prediction block may be a prediction sample included in the prediction block generated based on the motion information of the neighboring block.

As an example, a plurality of prediction blocks/prediction samples may include at least one of the prediction block ($P_L$) neighboring to the left of a current sub-block or a prediction sample in the left prediction block, the prediction block ($P_R$) neighboring to the right of the current sub-block or a prediction sample in the right prediction block, the prediction block ($P_A$) neighboring the top of the current sub-block or a prediction sample in the top prediction block, or the prediction block ($P_B$) neighboring the bottom of the current sub-block or a prediction sample in the bottom prediction block.

A neighboring prediction block or prediction samples in the neighboring prediction block may be generated based on motion information of the neighboring sub-block. For example, the left prediction block ($P_L$) may be generated based on motion information of the left sub-block. The right prediction block ($P_R$) may be generated based on the motion information of the right sub-block. The top prediction block ($P_A$) may be generated based on the motion information of the top sub block. The bottom prediction block ($P_B$) may be generated based on motion information of the bottom sub-block. Here, the motion information may include at least one of a motion vector, a reference picture index, or a bi-directional prediction indicator.

The second prediction block/the second prediction sample of a current sub-block may be obtained based on weighted prediction between the first prediction block/the first prediction sample of a current sub-block and a neighboring prediction block/a prediction sample included in a neighboring prediction block.

For example, the second prediction block of a current sub-block may be obtained based on weighted prediction between the first prediction block of the current sub-block and at least one of neighboring prediction blocks adjacent to the left, right, top, or bottom of the current sub-block. When the neighboring prediction block is generated based on the motion information of a neighboring block, the second prediction block of the current sub-block may be generated by a weighted sum operation between the reference block (that is, the first prediction block) specified based on the motion information of the current sub-block and the reference block specified based on the motion information of the neighboring block.

Overlapped block motion compensation may be applied to all sub-blocks included in a current block, or may be applied only to some of the sub blocks included in the current block. For example, overlapped block motion compensation may be performed only on a block adjacent to a pre-determined boundary among sub blocks included in the current block. Herein, the pre-determined boundary may represent a boundary adjacent to blocks that have been previously encoded/decoded. For example, the pre-determined boundary may include at least one of a top boundary, a left boundary, a right boundary, or a bottom boundary according to the encoding/decoding order or the size or shape of the current block.

A range of sub-blocks to which overlapped block motion compensation is applied may be determined based on at least one of the size, shape, inter prediction mode, a unit on which motion compensation is performed, or motion information of a current block. For example, when inter prediction is performed in a unit of a coding block (e.g., when a skip mode, a merge mode, or an AMVP mode is used), only some sub-blocks of the current block may be determined to be applied to overlapped block motion compensation. On the other hand, when inter prediction is performed in a unit of a sub-block (e.g., when ATMVP or STMVP mode is used), all sub-blocks in the current block may be determined to be subject to overlapped block motion compensation.

Alternatively, information indicating a range of sub-blocks to which overlapped block motion compensation is applied may be signaled through a bitstream. The information may include at least one of information indicating whether overlapped block motion compensation is applied to all sub-blocks or information indicating a position of a boundary adjacent to sub-blocks to which overlapped block motion compensation is applied.

Alternatively, a range of sub-blocks to which overlapped block motion compensation is applied may be determined according to whether there is an available neighboring sub-block. The availability of a neighboring sub-block may be determined based on whether the neighboring sub-block has the same motion information as a current sub-block, an inter prediction mode of the neighboring sub-block, a position of the neighboring sub-block, whether the neighboring sub-block is encoded by inter prediction, whether the neighboring sub-block exists, or whether the neighboring sub-block has been encoded/decoded. For example, a neighboring sub-block having the same motion information as the current sub-block may be determined to be unavailable. Herein, the same motion information may represent that at least one of a motion vector, a reference picture index, and a bi-directional prediction indicator is the same. In addition, the same motion information may represent a case where both motion information of a first direction and motion information of a second direction are the same, or may represent a case where any one of motion information of the first direction and motion information of the second direction is the same. Alternatively, when the neighboring sub-block is not encoded by inter prediction, when the neighboring sub-block does not exist, when the neighboring sub-block has not been encoded/decoded yet, or when the neighboring sub-block is included in a different coding tree block or a different slice (or tile) with the current sub-block, it may be determined that the neighboring sub-block is not available for overlapped block motion compensation.

Accordingly, when motion information of all sub-blocks in a current block is the same, since there are no neighboring sub-blocks available around the sub-blocks except for sub-blocks positioned at the top boundary and/or the left boundary of the current block, overlapped motion compensation may not be performed.

Figure 13A:
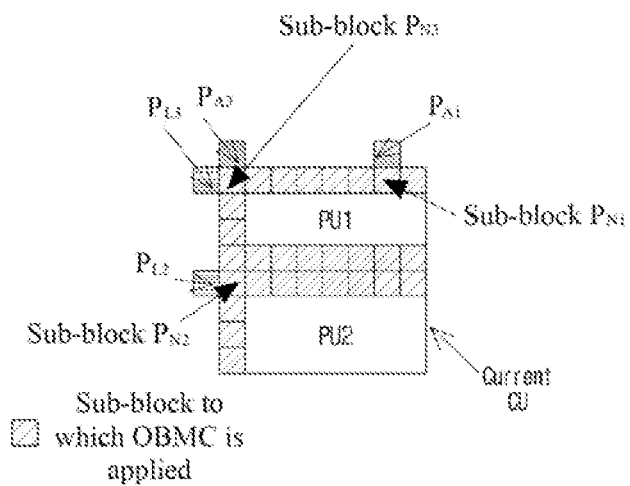
FIGS. 13A and 13B are diagrams for describing neighboring prediction blocks used to perform overlapped block motion compensation.
Figure 13B:
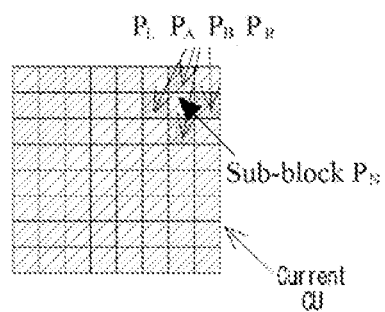

FIGS. 13A and 13B are diagrams for describing neighboring prediction blocks used to perform overlapped block motion compensation.

FIG. 13A illustrates an example in which overlapped block motion compensation is performed only on a sub-block located at a pre-determined boundary of a current block, and FIG. 13B illustrates an example in which overlapped block motion compensation is performed on all sub-blocks in a current block.

As in the example illustrated in FIG. 13A, overlapped block motion compensation may be performed on a sub-block adjacent to the left boundary of a current block and/or a sub-block adjacent to the top boundary of a current block. For example, as in the example illustrated in FIG. 13A, the overlapped block motion compensation is performed by using the top prediction block ($P_{A1}$) for a sub-block adjacent to the top boundary of a current block (e.g., the sub-block $P_{N1}$) and the overlapped Block motion compensation may be performed by using the left prediction block ($P_{L2}$) for a sub-block adjacent to the left boundary of a current block (e.g., the sub-block $P_{N2}$). Herein, the top prediction block may be obtained based on motion information of the top sub-block, and the left prediction block may be obtained based on motion information of the left sub-block. On the other hand, for a sub-block adjacent to the top left corner of a current block (e.g., the sub-block $P_{N3}$), overlapped block motion compensation may be performed using both the left prediction block ($P_{L3}$) and the top prediction block ($P_{A}$A.

As in the example illustrated in FIG. 13B, overlapped block motion compensation may be performed on all sub-blocks in a current block. For example, as in the example illustrated in FIG. 13B, overlapped block motion compensation for a sub-block may be performed using at least one of the left prediction block ($P_L$), the right prediction block ($P_R$), the top prediction block ($P_A$), or the bottom prediction ($P_B$) of a sub-block (e.g., the sub-block $P_N$)

An unavailable neighboring sub-block of neighboring sub-blocks or a prediction block derived therefrom may not be used to perform overlapped block motion compensation of a current sub-block. For example, a prediction block derived from a neighboring sub-block having the same motion information as a current sub-block may be determined as not available for overlapped block motion compensation.

When there are a plurality of neighboring prediction blocks available around a current sub-block, the second prediction block/the second prediction sample of a current sub-block may be obtained by sequentially weighted prediction of neighboring prediction samples included in the first prediction block/the first prediction sample of a current block and a plurality of available neighboring prediction blocks/available neighboring prediction samples. As such, performing overlapped block motion compensation by recursively weighted prediction of the first prediction sample and prediction samples included in a plurality of prediction blocks may be defined as recursive overlapped block motion compensation (recursive OBMC).

The weighted prediction order between a plurality of prediction blocks according to recursive overlapped block motion compensation may be pre-defined in an encoder and a decoder. For example, weighted prediction may be performed in order of the left prediction block ($P_L$), the top prediction block ($P_A$), the right prediction block ($P_R$), and the bottom prediction block ($P_B$) of a current sub-block.

Weighted prediction may be performed using a weighting parameter. The weighting parameter may include at least one of a weight or an offset. Herein, the weight represents a value that is multiplied by at least one of prediction samples used for the weighted prediction, and the offset represents a value that is added to a result to which a weighted sum is applied.

The weight and/or offset may be adaptively determined according to a position of a sample to be predicted (e.g., at least one of an x-axis position or a y-axis position). For example, when weighted prediction is performed using a neighboring prediction block located on the same horizontal line as a current sub-block, the weight and/or offset may be determined in consideration of the x-axis coordinate of the sample to be predicted. On the other hand, when weighted prediction is performed using a neighboring prediction block located on the same vertical line as a current sub-block, the weight and/or offset may be determined in consideration of the y-axis coordinate of the sample to be predicted.

For example, Equations 1 to 4 below illustrate recursively weighted prediction of prediction samples included in the first prediction sample and the neighboring prediction block to generate a second prediction sample.

$$P_{c1}(0,j)=(3*P_c(0,j)+P_L(0,j)+2)>>2$$

$$P_{c1}(1,j)=(7*P_c(1,j)+P_L(1,j)+4)>>3$$

$$P_{c1}(2,j)=(15*P_c(2,j)+P_L(2,j)+8)>>4$$

$$P_{c1}(3,j)=(31*P_c(3,j)+P_L(3,j)+16)>>5 \quad \text{[Equation 1]}$$

As shown in Equation 1, the first temporary prediction sample ($P_{C1}$) may be generated based on a weighted sum operation of the first prediction sample ($P_C$) and the prediction sample ($P_L$) included in the left prediction block. In this case, the weight applied to the first prediction sample ($P_C$) and the weight applied to the prediction sample ($P_L$) included in the left prediction block may be differently determined according to a position of a prediction target sample. In Equation 1, different weights are applied in units of rows.

$$P_{c2}(i,0)=(3*P_{c1}(i,0)+P_A(i,0)+2)>>2$$

$$P_{c2}(i,1)=(7*P_{c1}(i,1)+P_A(i,1)+4)>>3$$

$$P_{c2}(i,2)=(15*P_{c1}(i,2)+P_A(i,2)+8)>>4$$

$$P_{c2}(i,3)=(31*P_{c1}(i,3)+P_A(i,3)+16)>>5 \quad \text{[Equation 2]}$$

As shown in Equation 2, the second temporary prediction sample ($P_{C2}$) may be generated based on a weighted sum operation of the first temporary prediction sample ($P_{C1}$) and the prediction sample ($P_A$) included in the top prediction block. In this case, the weight applied to the first temporary prediction sample ($P_{C1}$) and the weight applied to the prediction sample ($P_A$) included in the top prediction block may be differently determined according to a position of a prediction target sample. In Equation 2, different weights are applied in units of columns.

$$P_{c3}(0,j)=(31*P_{c2}(0,j)+P_R(0,j)+16)>>5$$

$$P_{c3}(1,j)=(15*P_{c2}(1,j)+P_R(1,j)+8)>>4$$

$$P_{c3}(2,j)=(7*P_{c2}(2,j)+P_R(2,j)+4)>>3$$

$$P_{c3}(3,j)=(3*P_{c2}(3,j)+P_R(3,j)+2)>>2 \quad \text{[Equation 3]}$$

As shown in Equation 3, the third temporary prediction sample ($P_{C3}$) may be generated based on a weighted sum operation of the second temporary prediction sample ($P_{C2}$) and the prediction sample ($P_R$) included in the right prediction block. In this case, the weight applied to the second temporary prediction sample ($P_{C2}$) and the weight applied to the prediction sample ($P_R$) included in the right prediction block may be differently determined according to a position of a prediction target sample. In Equation 3, different weights are applied in units of rows.

$$P_c(i,0)=(31*P_{c3}(i,0)+P_B(i,0)+16)>>5$$

$$P_c(i,1)=(15*P_{c3}(i,1)+P_B(i,1)+8)>>4$$

$$P_c(i,2)=(7*P_{c3}(i,2)+P_B(i,2)+4)>>3$$

$$P_c(i,3)=(3*P_{c3}(i,3)+P_B(i,3)+2)>>2 \quad \text{[Equation 4]}$$

As shown in Equation 4, the second prediction sample ($P_C$) may be generated based on a weighted sum operation of the third temporary prediction sample ($P_{C3}$) and the prediction sample ($P_B$) included in the bottom prediction block. In this case, the weight applied to the third temporary prediction sample ($P_{C3}$) and the weight applied to the prediction sample ($P_B$) included in the right prediction block may be differently determined according to a position of a prediction target sample. In Equation 4, different weights are applied in units of columns.

A weighted prediction order between a plurality of prediction blocks may be variably determined according to the size, shape, motion information or position of a current block or a current sub-block. For example, when the current block is a rectangle whose the width is greater than the height, the weighted prediction may be performed in an order of the top prediction block ($P_A$), the left prediction block ($P_L$), the bottom prediction block ($P_B$), and the right prediction block ($P_R$) of a current sub-block. On the other hand, if the current block is a rectangle whose the height is greater than the width, the weighted prediction may be performed in an order of the left prediction block ($P_L$), the top prediction block ($P_A$), the right prediction block ($P_R$), and the bottom prediction block ($P_B$) of a current sub-block.

Alternatively, information indicating the weighted prediction order between a plurality of prediction blocks may be signaled through a bitstream. The information may be signaled at the picture, slice or block level.

In Equations 1 to 4, recursive overlapped block motion compensation is performed using four neighboring prediction blocks. Alternatively, recursive overlapped block motion compensation may be performed using only some neighboring prediction blocks.

When applying recursive overlapped block motion compensation, the value of the second prediction sample may be varied depending on a weighted prediction order of neighboring prediction blocks. In addition, when a magnitude of a temporary prediction sample highly increases at a specific time point, a prediction sample of a neighboring prediction block which is weighted predicted with the temporary prediction sample may not have a significant influence on a weighted sum operation. In addition, as the weighted prediction is performed, the magnitude of the second prediction sample may become too large, resulting in deterioration of image quality of the predicted image.

To solve these problems, instead of weighted prediction of a current block and prediction blocks sequentially, separable overlapped block motion compensation (Separable OBMC) may be considered that perform a weighted prediction of the current block and the prediction blocks in the horizontal direction, and perform a weighted prediction of the current block and the prediction blocks in a vertical direction.

Separable overlapped block motion compensation may include horizontal weighted prediction and vertical weighted prediction. Horizontal weighted prediction means weighted prediction between a current sub-block and at least one neighboring prediction block located on the same horizontal line as the current sub-block, and vertical weighted prediction means weighted prediction between the current sub-block and at least one neighboring prediction block located on the same vertical line as the current sub-block. For example, horizontal weighted prediction may be performed using at least one of the left prediction block or the right prediction block of the current sub-block, and vertical weighted prediction may be performed using at least one of the top prediction block or the bottom prediction block of the current sub-block.

Weighted prediction may be performed using weighted parameters. The weighting parameter may include at least one of a weight or an offset. Herein, the weight represents a value that is multiplied by at least one of prediction samples used for the weighted prediction, and the offset represents a value that is added to a result to which a weighted sum is applied.

A weight and/or offset may be adaptively determined according to the position of a sample to be predicted (e.g., at least one of the x-axis position or the y-axis position). For example, when performing horizontal weighted prediction, a weight and/or offset may be determined in consideration of the x-axis coordinate of a sample to be predicted. On the other hand, when performing vertical weighted prediction, a weight and/or offset may be determined in consideration of the y-axis coordinate of a sample to be predicted.

Separable overlapped block motion compensation may be performed in a pre-defined order. For example, after performing horizontal weighted prediction, vertical weighted prediction may be performed. An execution order of the separable overlapped block motion compensation may be pre-defined in an encoder and a decoder.

Alternatively, an execution order may be determined based on the size, shape, inter prediction mode, motion information of a current block, a unit for motion compensation, or the like. For example, when the current block is a rectangle whose the width is greater than the height, horizontal weighted prediction may be performed prior to vertical weighted prediction. On the other hand, when the current block is a rectangle whose the height is greater than the width, vertical weighted prediction may be performed prior to horizontal weighted prediction.

Alternatively, information indicating an order of performing separable overlapped block motion compensation may be signaled through a bitstream. The information may be signaled at a picture, slice or block level.

Equations 5 and 6 illustrate examples in which overlapped block motion compensation is performed in an order of horizontal weighted prediction and vertical weighted prediction.

$$P_{ch}(0,j)=(92P_c(0,j)+4P_L(0,j)+32P_R(0,j)+64)>>7$$

$$P_{ch}(1,j)=(104P_c(1,j)+8P_L(1,j)+16P_R(1,j)+64)>>7$$

$$P_{ch}(2,j)=(104P_c(2,j)+16P_L(2,j)+8P_R(2,j)+64)>>7$$

$$P_{ch}(3,j)=(92P_c(3,j)+4P_L(3,j)+32P_R(2,j)+64)>>7 \quad \text{[Equation 5]}$$

As shown in Equation 5, a horizontal overlapped block prediction sample ($P_{ch}$) may be generated based on a weighted sum operation of the first prediction sample ($P_c$), the prediction sample ($P_L$) included in the left prediction block, and the prediction sample ($P_R$) included in the right prediction block. In this case, weights applied to each of the first prediction sample ($P_c$), the prediction sample ($P_L$) included in the left prediction block, and the prediction sample ($P_R$) included in the right prediction block may be differently determined according to the position of a prediction target sample. In Equation 5, different weights are applied in units of rows.

$$P_c(i,0)=(92P_{ch}(i,0)+32P_L(i,0)+64P_R(i,0)+64)>>7$$

$$P_c(i,1)=(104P_{ch}(i,1)+16P_L(i,1)+64P_R(i,0)+64)>>7$$

$$P_c(i,2)=(104P_{ch}(i,2)+8P_L(i,2)+64P_R(i,0)+64)>>7$$

$$P_c(i,3)=(92P_{ch}(i,3)+4P_L(i,2)+64P_R(i,0)+64)>>7 \quad \text{[Equation 6]}$$

When horizontal overlapped block prediction sample ($P_{ch}$) is obtained, a second prediction sample ($P_c$) may be generated based on a weighted sum operation of the horizontal overlapped block prediction sample ($P_{ch}$), a prediction sample ($P_A$) included in the top prediction block, and a prediction sample ($P_B$) included in the bottom prediction block as shown in Equation 6. In this case, weights applied to each of the horizontal overlapped block prediction sample ($P_{ch}$), a prediction sample ($P_A$) included in the top prediction block, and a prediction sample ($P_B$) included in the bottom prediction block may be differently determined according to the position of a prediction target sample.

Equations 7 and 8 illustrate an example in which overlapped block motion compensation is performed in an order of vertical weighted prediction and horizontal weighted prediction.

$$P_{cv}(i,0)=(92P_c(i,0)+32P_A(i,0)+4P_B(i,0)+64)>>7$$

$$P_{cv}(i,1)=(104P_c(i,1)+16P_A(i,1)+8P_B(i,1)+64)>>7$$

$$P_{cv}(i,2)=(104P_c(i,2)+8P_A(i,2)+16P_B(i,2)+64)>>7$$

$$P_{cv}(i,3)=(92P_c(i,3)+4P_A(i,2)+32P_B(i,2)+64)>>7$$

$$P_c(0,j)=(92P_{cv}(0,j)+4P_L(0,j)+32P_R(0,j)+64)>>7$$

$$P_c(1,j)=(104P_{cv}(1,j)+8P_L(1,j)+32P_R(1,j)+64)>>7$$

$$P_c(2,j)=(104P_{cv}(2,j)+16P_L(2,j)+32P_R(2,j)+64)>>7$$

$$P_c(3,j)=(92P_{cv}(3,j)+4P_L(3,j)+32P_R(2,j)+64)>>7 \quad \text{[Equation 7]}$$

As shown in Equation 7, a vertical overlapped block prediction sample ($P_{cv}$) may be generated based on a weighted sum operation of the first prediction sample ($P_c$), a prediction sample ($P_A$) included in the top prediction block, and a prediction sample ($P_B$) included in the bottom prediction block. In this case, weights applied to each of the first prediction sample ($P_c$), the prediction sample ($P_A$) included in the top prediction block, and a prediction sample ($P_B$) included in the bottom prediction block may be differently determined according to the position of a prediction target sample. In Equation 7, it is shown that different weights are applied in units of columns $$P_{cv}(i,0)=(92P_c(i,0)+32P_A(i,0)+4P_B(i,0)+64)>>7$$

$$P_{cv}(i,1)=(104P_c(i,1)+16P_A(i,0)+4P_B(i,1)+64)>>7$$

$$P_{cv}(i,2)=(104P_c(i,2)+8P_A(i,0)+4P_B(i,2)+64)>>7$$

$$P_{cv}(i,3)=(92P_c(i,3)+4P_A(i,0)+4P_B(i,2)+64)>>7$$

$$P_c(0,j)=(92P_{cv}(0,j)+4P_L(0,j)+32P_R(0,j)+64)>>7$$

$$P_c(1,j)=(104P_{cv}(1,j)+8P_L(1,j)+32P_R(1,j)+64)>>7$$

$$P_c(2,j)=(104P_{cv}(2,j)+16P_L(2,j)+32P_R(2,j)+64)>>7$$

$$P_c(3,j)=(92P_{cv}(3,j)+4P_L(3,j)+32P_R(2,j)+64)>>7 \quad \text{[Equation 8]}$$

When the vertical overlapped block prediction sample ($P_{cv}$) is obtained, the second prediction sample ($P_c$) may be generated based on a weighted sum operation of the vertical overlapped block prediction sample ($P_{cv}$), a prediction sample ($P_L$) included in the left prediction block, and a prediction sample ($P_R$) included in the right prediction block as shown in Equation 8. In this case, weights applied to each of the vertical overlapped block prediction sample ($P_{cv}$), a prediction sample ($P_L$) included in the left prediction block, and a prediction sample ($P_R$) included in the right prediction block may be differently determined according to the position of a prediction target sample. In Equation 8, different weights are applied in units of rows.

In the above example, it has been described that the horizontal weighted prediction and the vertical weighted prediction are performed in a pre-determined order. As another example, the horizontal weighted prediction and the vertical weighted prediction may be performed in parallel. For example, when a horizontal overlap block prediction sample ($P_{ch}$) is obtained through horizontal weighted prediction and a vertical overlapped block prediction sample ($P_{cv}$) is obtained through vertical weighted prediction, the second prediction sample may be obtained through weighted prediction between the horizontal overlapped block prediction sample ($P_{ch}$) and the vertical overlapped block prediction sample ($P_{cv}$).

Overlapped block motion compensation may be performed using only one of the horizontal weighted prediction and the vertical weighted prediction. For example, it is determined whether to perform horizontal weighted prediction and/or vertical weighted prediction based on the size, shape, inter prediction mode, motion information, availability of neighboring sub-blocks, or location of the first prediction target sample of a current block.

When the second prediction sample is obtained through overlapped block motion compensation, the current block may be reconstructed based on the second prediction sample. Specifically, a reconstruction sample of the current block may be obtained by adding the second prediction sample and a residual sample.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to an electronic device capable of encoding/decoding an image.

The invention claimed is:

1. A method of decoding a video, the method comprising:
determining, based on a flag signaled via a bitstream, which of a sub-block level motion vector derivation or a block level motion vector derivation is applied to a current block,
wherein in response that the block level motion vector derivation is applied to the current block, the method further comprises:
   deriving merge candidates for the current block,
   wherein the merge candidates comprise spatial merge candidates that are derived from a plurality of spatial neighboring blocks adjacent to the current block,
   wherein the plurality of spatial neighboring blocks comprise at least one of a top neighboring block, a left neighboring block, a top-left neighboring block, a top-right neighboring block or a bottom-left neighboring block;
   deriving a block level motion vector of the current block from a merge candidate specified by a merge index, the merge index specifying one of the merge candidates; and
   deriving a prediction block of the current block based on the block level motion vector of the current block,
wherein in response that the sub-block level motion vector derivation is applied to the current block, the method further comprises:
   obtaining a temporary motion vector of the current block;
   determining a corresponding block in a source picture based on the temporary motion vector of the current block, the source picture being specified by source picture index information;
   obtaining a sub-block level motion vector of a sub-block in the current block based on a motion vector of the corresponding block, the current block being partitioned into a plurality of sub-blocks of a fixed size; and
   obtaining a sub-prediction block for the sub-block based on the sub-block level motion vector,
   wherein the temporary motion vector of the current block is derived from a pre-defined neighboring block without selecting one from the plurality of spatial neighboring blocks, the pre-defined neighboring block being the left neighboring block,
   wherein the temporary motion vector derived from the pre-defined neighboring block is shared for all of the sub-blocks included in the current block to derive their respective corresponding block, and
   wherein the source picture specified by the source picture index information is the same as a reference picture of the pre-defined neighboring block.

2. The method of video decoding of claim 1, wherein whether the sub-block level motion vector derivation is allowed for the current block or not is determined by comparing a size of the current block with a threshold size, and
   wherein the flag is parsed from the bitstream only when it is determined that the sub-block level motion vector derivation is allowed for the current block.

3. A method of encoding a video, the method comprising:
determining which of a sub-block level motion vector derivation or a block level motion vector derivation is applied to a current block, a flag indicating one of the sub-block level motion vector derivation and the block level motion vector derivation being encoded into a bitstream,
wherein in response that the block level motion vector derivation is applied to the current block, the method further comprises:
   deriving merge candidates for the current block,
   wherein the merge candidates comprise spatial merge candidates that are derived from a plurality of spatial neighboring blocks adjacent to the current block,
   wherein the plurality of spatial neighboring blocks comprise at least one of a top neighboring block, a left neighboring block, a top-left neighboring block, a top-right neighboring block or a bottom-left neighboring block;
   deriving a block level motion vector of the current block from a merge candidate, a merge index specifying the merge candidate among the merge candidates being encoded into the bitstream; and
   deriving a prediction block of the current block based on the block level motion vector of the current block,
wherein in response that the sub-block level motion vector derivation is applied to the current block, the method further comprises:
   obtaining a temporary motion vector of the current block;
   determining a corresponding block in a source picture based on the temporary motion vector of the current block;
   obtaining a sub-block level motion vector of a sub-block in the current block based on a motion vector of the corresponding block, the current block being partitioned into a plurality of sub-blocks of a fixed size; and
   obtaining a sub-prediction block for the sub-block based on the sub-block level motion vector,
   wherein the temporary motion vector of the current block is derived from a pre-defined neighboring block without selecting one from the plurality of spatial neighboring blocks, the pre-defined neighboring block being the left neighboring block,
   wherein the temporary motion vector derived from the pre-defined neighboring block is shared for all of the sub-blocks included in the current block to derive their respective corresponding block, and
   wherein the source picture is the same as a reference picture of the pre-defined neighboring block.

4. The method of video encoding of claim 3, wherein whether the sub-block level motion vector derivation is allowed for the current block or not is determined by comparing a size of the current block with a threshold size, and
   wherein the flag is encoded into the bitstream only when it is determined that the sub-block level motion vector derivation is allowed for the current block.

5. A non-transitory computer readable recording medium for storing instructions which when executed by a processor cause the processor to perform the steps comprising:
determining which of a sub-block level motion vector derivation or a block level motion vector derivation is applied to a current block, a flag indicating one of the sub-block level motion vector derivation and the block level motion vector derivation being encoded into a bitstream,
wherein in response that the block level motion vector derivation is applied to the current block, the steps further comprises:

deriving merge candidates for the current block, wherein the merge candidates comprise spatial merge candidates that are derived from a plurality of spatial neighboring blocks adjacent to the current block, wherein the plurality of spatial neighboring blocks comprise at least one of a top neighboring block, a left neighboring block, a top-left neighboring block, a top-right neighboring block or a bottom-left neighboring block;

deriving a block level motion vector of the current block from a merge candidate, a merge index specifying the merge candidate among the merge candidates being encoded into the bitstream; and deriving a prediction block of the current block based on the block level motion vector of the current block, wherein in response that the sub-block level motion vector derivation is applied to the current block, the steps further comprises:

obtaining a temporary motion vector of the current block;

determining a corresponding block in a source picture based on the temporary motion vector of the current block;

obtaining a sub-block level motion vector of a sub-block in the current block based on a motion vector of the corresponding block, the current block being partitioned into a plurality of sub-blocks of a fixed size; and obtaining a sub-prediction block for the sub-block based on the sub-block level motion vector, wherein the temporary motion vector of the current block is derived from a pre-defined neighboring block without selecting one from the plurality of spatial neighboring blocks, the pre-defined neighboring block being the left neighboring block, wherein the temporary motion vector derived from the pre-defined neighboring block is shared for all of the sub-blocks included in the current block to derive their respective corresponding block, and wherein the source picture is the same as a reference picture of the pre-defined neighboring block.

* * * * *